United States Patent [19]
Kosisky

[11] 3,908,877
[45] Sept. 30, 1975

[54] HOLDER AND SERVER FOR BEVERAGE CUPS AND THE LIKE

[76] Inventor: Daniel F. Kosisky, 3365 Wye Mills South, Laurel, Md. 20810

[22] Filed: Feb. 12, 1974

[21] Appl. No.: 441,908

[52] U.S. Cl. .................... 224/48 A; 206/459
[51] Int. Cl.² ........................ A47G 23/06
[58] Field of Search .... 224/48 R, 48 C, 48 A, 48 E, 224/48 F, 48 D; 206/459; 220/85 D

[56] References Cited
UNITED STATES PATENTS

| | | | |
|---|---|---|---|
| 1,370,811 | 3/1921 | Harding et al. | 224/48 A |
| 1,448,259 | 3/1923 | Cook | 224/48 A |
| 1,659,344 | 2/1928 | Wissman | 224/48 C |
| 1,972,519 | 9/1934 | Hasenour | 224/48 A |
| 1,997,587 | 4/1935 | Kold | 224/48 R |
| 2,974,781 | 3/1961 | Zimmerman | 206/459 |
| 3,032,186 | 5/1962 | Jenkins | 224/48 R |
| 3,103,303 | 9/1963 | Lynchey | 224/48 R |
| 3,127,986 | 4/1964 | Hulka | 206/459 |

FOREIGN PATENTS OR APPLICATIONS

| | | | |
|---|---|---|---|
| 317,989 | 8/1929 | United Kingdom | 224/46 X |
| 411,272 | 1/1910 | France | 206/459 |
| 905,374 | 4/1945 | France | 206/459 |

Primary Examiner—Robert J. Spar
Assistant Examiner—Kenneth Noland
Attorney, Agent, or Firm—B. P. Fishburne, Jr.

[57] ABSTRACT

A preferably circular tray contains a plurality of circumferentially spaced openings which may receive tapered beverage cups and the like and support the same in a stable manner. A central upstanding handle allows carrying of the tray or holder in a balanced condition. Spaced depending legs on the tray are of a length to support the device on a level surface with the bottoms of the cups elevated from such surface. The upper surface of the tray has a velvetized finish to accept writing adjacent to the cup-receiving openings so that the beverage orders of individuals may be noted.

1 Claim, 4 Drawing Figures

U.S. Patent   Sept. 30, 1975   3,908,877
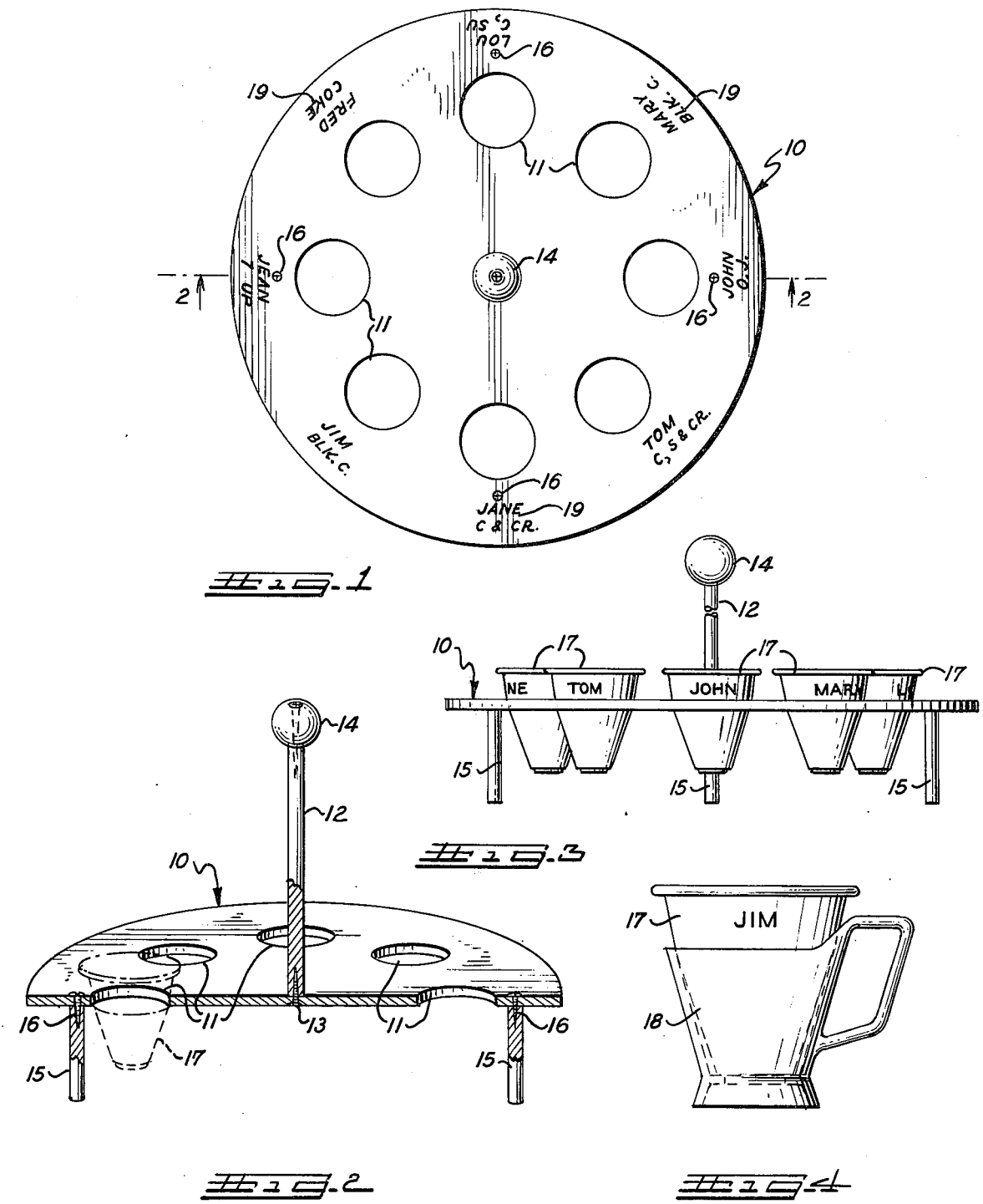

HOLDER AND SERVER FOR BEVERAGE CUPS AND THE LIKE

BACKGROUND OF THE DISCLOSURE

Devices are known in the prior art for carrying and supporting beverage cups and like articles. Examples of the prior patented art are contained in U.S. Pat. Nos. 451,166; 1,067,151; 1,305,164; 1,370,811; and 3,142,425. While these patented devices are useful, they lack the ability to answer a need that the present invention has been developed to completely satisfy.

More particularly, in certain offices, groups of workers will have individual tastes or desires in terms of the beverages which they prefer on so-called coffee breaks. These preferences will vary from black coffee through cream and sugar, soft drinks and fruit juices. Where groups of office workers numbering up to six or eight are located somewhat remotely from the snack or beverage source, it becomes a problem in terms of serving the workers and in some instances a good deal of time can be wasted during the working day in terms of individual workers traveling back and forth to the coffee bar. It is seen that this can develop into an economical loss of considerable proportions when the situation is multiplied across the country.

The problem, therefore, of serving beverages to a group of office workers or the like may not be satisfactorily solved by merely utilizing a conventional tray or box for one individual to transport beverages for the group. The individual tastes of the group require the writing of a list and the individual marking of cups or cup lids, which can be quite a nuisance to those involved. The above-noted prior art devices suggest partial solution of the problem but not the complete solution particularly in terms of facilitating notation on the beverage server or holder adjacent to individual cups the particular type of beverage that each individual in the group prefers. In this connection, the invention completely solves the annoying problem of individual beverage identification and solves it in a way whereby the holder, server or tray may be conveniently reused indefinitely by the provision thereon of a texturized writing surface which will accept graphite or the like and permit easy removal or erasure thereon. Reusable plastic beverage cups may be employed in the interest of saving material during the energy crisis and the name of the individual user may be written on the cup and also on the tray writing surface adjacent to one cup opening to render the serving system foolproof and most expeditious.

Other features of the invention will be understood during the course of the following detailed description.

BRIEF DESCRIPTION OF DRAWING FIGURES

FIG. 1 is a plan view of a beverage cup holder or server embodying the invention.

FIG. 2 is a perspective view thereof, partly in section.

FIG. 3 is a side elevation of the invention showing the same loaded with cups.

FIG. 4 is a side elevation showing one type of reusable cup and plastic holder suitable for use with the invention.

DETAILED DESCRIPTION

Referring to the drawings in detail wherein like numerals designate like parts, the numeral 10 designates a holder body or tray for beverage cups in the form of a relatively thin flat circular plate preferably formed of a plastic. Although the invention is not limited to particular dimensions, it is contemplated that the tray 10 will measure about seventeen inches in diameter and one-quarter inch thick. At least the top face of the tray 10 during the manufacturing thereof by known techniques will be provided with a velvetized surface of a character which will readily accept writing by a graphite pencil or like implement. The nature of the writing surface allows the written indicia to be wiped off or erased. If preferred, the writing acceptance surface on the tray 10 may be limited to localized areas adjacent to the outer sides of cup-receiving circular openings 11 formed through the tray during its manufacturing or molding. The openings 11 may number eight in a circular array and are equidistantly spaced circumferentially. They are arranged concentrically with the axis of the circular tray. In terms of commerical cup sizes on today's market, the openings 11 will measure approximately 2 ⅝ in diameter, but again the invention is not limited to these sizes. Also the number of openings in the tray may be varied depending upon the overall size of the device. It has been determined, however, that a group of eight beverage cups may be conveniently spaced and supported on a tray of the approximate size specified above, without the structure becoming awkward or inconvenient to handle. An eight-cup capacity is thought to be adequate to handle the needs of most office groups.

The device additionally comprises a centrally located upstanding carrying handle 12 in the form of a plastic rod which may be attached to the body or tray 10 as by screw 13. Preferably the handle is provided with a knob 14 at its upper end for convenience. In terms of the tray size specified above, the length of the handle 12 is about 8 inches. The central handle promotes carrying the server in a balanced condition.

To support the server on a desk or the like preferably four equidistantly spaced plastic legs 15 of equal length are provided near and inwardly of the tray margin. These legs may be attached to the tray body by suitable screws 16 or equivalent means. The legs 15 should be about three inches long to assure that none of the various commerical types of cups will contact a supporting desk surface when the device is placed upon such surface.

While the tray 10 will accept various forms of commerical cups including plastic cups, paper cups and cups made of styrofoam, a preferred cup for use with the device is a plastic "Sweetheart"-type cup 17 which is tapered and whose surface will accept writing. This particular cup is supplied with a convenient reusable holder 18 which will last indefinitely. The cups 17 are quite durable and can be rinsed and reused a number of times in the interest of economizing on material and energy.

As shown in the drawing, the cups 17 may be individually marked with the name of the user and corresponding names may be written on the outer marginal portion of the tray 10 adjacent particular openings 11. Identifying numbers could be used instead of names, if preferred. Also written on the writing accepting surface or surfaces of the tray are the individual beverage selections or orders as indicated by the numeral 19.

It may be seen that the invention enables an office group or party group at home to select individual beverages according to desires and obtain the serving of such beverages in a highly convenient and expeditious manner without the usual confusion and the likelihood of the wrong beverage being picked up by individuals. While the invention has been created in terms of a beverage server and is primarily intended for this usage, it may be employed as a condiment holder, holder for artists' colors, or for a variety of similar purposes. It is characterized by simplicity, convenience of use, and economy.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A holder and server for beverage cups and the like comprising a circular plate body portion having a plurality of circumferentially equidistantly spaced cup-receiving openings formed therethrough, said openings being centered on a circle concentric with the center of the plate body portion and spaced radially inwardly from the circular margin of the plate body portion, at least the top surface of the plate body portion formed to provide an easily erasurable writing-receiving surface adjacent each cup-receiving opening, whereby beverages of individuals being served may be readily changeably identified on said top surface, said plate body portion being formed of velvetized plastic and said top surface being textured to produce said erasurable writing-receiving surface, a single upstanding handle for the holder and server fixed to the circular plate body portion at the center thereof and spaced equidistantly from said openings, and a plurality of circumferentially equidistantly spaced support legs of equal length dependingly fixedly secured to the bottom of the plate body portion and lying on a circle concentric with the circle on which the openings are centered and radially outwardly thereof and between the openings and the margin of the plate body portion.

* * * * *